Sept. 11, 1973 R. REICHLE 3,758,336
INFORMATION CARRIER CONSTRUCTION
Filed April 29, 1971

INVENTOR
ROLF REICHLE
BY
[signature]
his ATTORNEY

United States Patent Office 3,758,336
Patented Sept. 11, 1973

3,758,336

INFORMATION CARRIER CONSTRUCTION

Rolf Reichle, Stuttgart, Germany, assignor to Robert Bosch G.m.b.H., Stuttgart, Germany Filed Apr. 29, 1971, Ser. No. 138,670
Claims priority, application Germany, May 2, 1970, P 20 21 502.5
Int. Cl. G01d 15/08
U.S. Cl. 117—217 10 Claims

ABSTRACT OF THE DISCLOSURE

An information carrier has at least one substrate support layer of dielectric material and, on an exposed face thereof at least one metallic registration layer which is adapted to have an information-denoting track of predetermined width formed therein during use. The face of the substrate support layer and correspondingly the exposed surface of the metallic registration layer—which latter is of constant thickness—have unevenesses in form of hills and valleys the height-differential between which is greater than the predetermined thickness of the registration layer and smaller than the predetermined width of the track to be formed.

BACKGROUND OF THE INVENTION

The present invention relates generally to information carrier constructions, and more particularly to information carriers for registration purposes.

Information carriers of this general type are already known and are used most often, although not exclusively, in electrically operated apparatus, wherein a stylus in form of an electrode burns a track into the registration layer, with the stylus being moved with reference to the information carrier in dependence upon certain values which are measured and which control such movement. The known information carriers have a support layer provided with a thin metallic registration layer which is burnt away along the track denoting information, the track being formed by a thin wire electrode from which current enters into the metallic layer to burn it away along the aforementioned track.

It is generally desirable that the track be as constant in its width as possible, and that its edges be as clear and sharp as possible to make subsequent reading simple and reliable. In order to achieve these purposes it is known heretofore to use as carriers for the metallic registration layer foils whose surface carrying the registration layer is as smooth as possible and consequently has a very small unevenness of at most 1 mu=$10^6$ m.=1 micron. However, experience has shown that information carriers constructed in this manner are extremely susceptible to mechanical damage. If, for instance, an operator accidentally wipes a finger over the registration layer—which generally has a thickness of only approximately 0.05 $\mu$m.—then dust particles which are carried along with the moving finger scratch tracks into the registration layer, and these tracks cannot be told apart from the actual information-denoting track, making it extremely difficult to subsequently read-out the information which has been registered on the carrier by the electrode. It is hardly necessary to point out that this is highly undesirable.

SUMMARY OF THE INVENTION

It is, accordingly, an object of the present invention to avoid the aforementioned disadvantages.

More particularly, it is an object of the present invention to provide an improved information carrier which is not possessed of these disadvantages.

A concomitant object of the invention is to provide such an improved information carrier on which tracks which are accidentally formed in the registration layer, can be clearly told apart from the purposely formed information-denoting track or tracks produced by the electrode stylus.

In pursuance of the above-objects and others which will become apparent hereinafter, one feature of the invention resides in an information carrier which, briefly stated comprises at least one substrate support layer of dielectric material having a face, and at least one metallic registration layer provided on this face and adapted to have an information-denoting track of predetermined width formed therein during use. The metallic registration layer has a predetermined thickness and an exposed surface which is uneven and which is provided with hills and valleys the height-differential between which is greater than the thickness of the metallic registration layer but smaller than the predetermined width or maximum width of the information-denoting track.

Preferably, the height-differential is between 2 $\mu$m.–8 $\mu$m.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
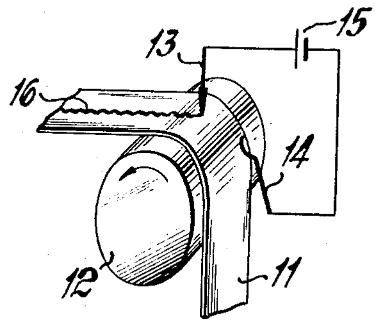
FIG. 1 is a simplified diagrammatic perspective view illustrating a registration apparatus with which the registration carrier according to the present invention is to be used.

Discussing now the drawing in detail, and firstly FIG. 1, it will be seen that the diagrammatically illustrated registering device has a rotating roller 12 over which the information carrier according to the present invention advances. An electrode stylus 13 has electric current passing through it and into the metallic registration layer of the carrier 11, and in so doing burns into the registration layer an information-denoting track 16.

The circuit for the current which forms the track 16 is completed via a source of electrical energy 15, the electrode stylus 13, the metallic registration layer of the carrier 11 and a slide contact 14. The current value is so set that the track formed is at most as wide as the electrode stylus 13 itself and that a precise track is produced which has sharply defined edges. Conventionally, the electrode stylus is approximately 0.05–0.2 mm. wide.

It is with such an apparatus as shown in FIG. 1 that a registration carrier according to the present invention is used.

Figure 2:
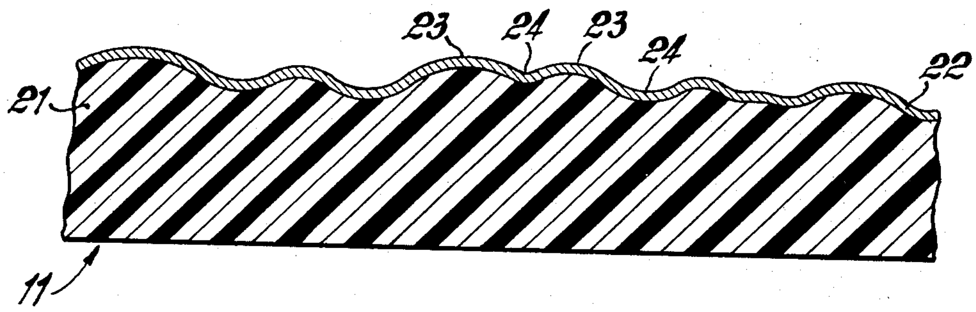
FIG. 2 is a vertical section, enlarged and not drawn to scale, of a fragment of an information carrier according to one embodiment of the invention.

One embodiment of such a carrier is illustrated in FIG. 2 which, be it pointed out again, is not to scale. The carrier is identified with reference numeral 11 and composed in this embodiment of a substrate layer 21 having an exposed face onto which there is provided—usually by vapor deposition—a metallic registration layer 22 whose actual thickness (unlike the exaggerated thickness shown) is approximately 0.05 μm. The exposed surface of the layer 22 has the diagrammatically shown hills 23 and valleys 24, that is instead of being smooth it is rough, and the height-differential between the lowest points of the valleys and the highest point of the hills is on the order of approximately 2–8 μm.

Figure 3A:
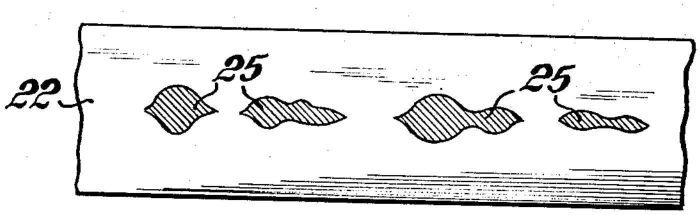
FIG. 3*a* is a fragmentary top-plan view of FIG. 2 illustrating an accidental scratch formed in the information carrier of FIG. 2.

If an information carrier such as the one shown in FIG. 2 is accidentally scratched on the exposed surface of its layer 22, the layer 22 is damaged (and removed in part) only at the higher points, that is at the hills, so that the track of an accidental scratch will have approximately the configuration which is shown in FIG. 3*a* on an enlarged scale. Comparing this to FIG. 3*b* which shows a purposely formed information-denoting track 16 produced by the electrode stylus 13, it will be seen that accidental tracks can be readily told apart from purposely formed information-denoting tracks. Furthermore, with the construction according to the present invention, the formation of the information denoting track 16, including the sharpness of its edges is much improved over what is known from the art where the information carrier is smooth.

Figure 3B:
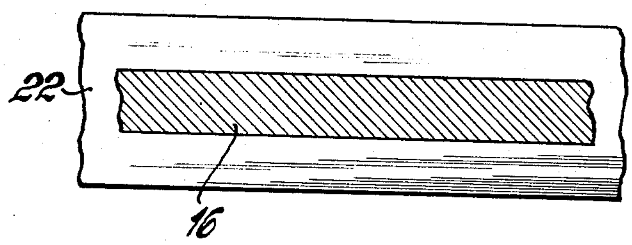
FIG. 3*b* is a view similar to FIG. 3*a* but illustrating a purposely formed information-denoting track.

The advantages of the present invention result from the fact that the purposely formed information-denoting track 16 is wider than the height-differential between the hills and valleys of the layer 22. While the electrode stylus 13 contacts only the hills of the layer 22 as would a fingernail or other object which could cause the accidental track of FIG. 3*a*, the electrode burns away the layer 22 not only at the hills but also in the valleys unlike the accidental tracks of FIG. 3*a* where only the hills are removed. The width of the information-denoting track 16 is not influenced by the height-differential as long as the latter is substantially smaller than the width of the track 16. In the embodiment of FIGS. 2–3*b*, this requirement is fulfilled because the width of the track 16 is approximately 50–200 μm. and the height-differential is only between approximately 2–8 μm.

There are two additional advantages associated with the novel construction. On the one hand, a mechanically formed accidental scratch on a smooth (prior art) information carrier can extend over the entire width of the carrier and can thus interrupt the electrical connection between the electrode 13 and the slider or slide contact 14 in which case the track 16 formed by the electrode stylus 13 will either disappear or else begin to look the same as if it had been accidentally formed, depending upon how strongly the stylus presses against the surface of the carrier. This is impossible with the present invention because the mechanical scratch shown in FIG. 3*a* by way of example, clearly will leave many electrically conductive portions of the layer 22 untouched.

Furthermore, the roughness of the surface of the layer 22 of the carrier 11 according to the present invention has a cleaning effect which tends to remove the oxide beard or combustion residue which forms at the tip of the electrode stylus 13. This is one of the reasons why the information-denoting track which can be formed by the stylus 13 in the layer 22 of the carrier 11 according to the present invention is of more equal width and has more sharply defined edges than is the case in carriers according to the prior art.

Figure 4:
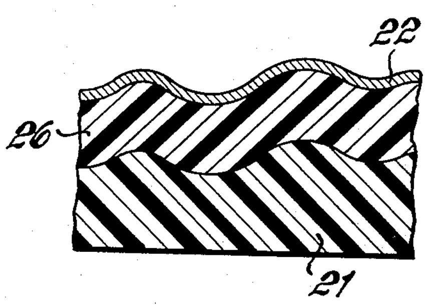
FIG. 4 is a view similar to FIG. 2 but illustrating a further embodiment of the invention.

The embodiment illustrated in FIG. 4 is largely similar to that of FIG. 2. Here, however, an additional layer 26 of dielectric material is interposed between the layers 21 and 22. In this case, it is the exposed face of the layer 26 which carries the layer 22 and which is therefore provided with hills and valleys to correspondingly provide the exposed surface of the layer 22 with such hills and valleys. The purpose of providing the layer 26 is to further increase the contrast between the layer 22 and the underlying material, which material (that of the layer 26) is exposed in the track 16. It is not always possible to make the layer 21 of a material which will afford sufficient contrast, but in such case, the layer 26 can be utilized which then can provide this contrast. The height-differential between the hills and the valleys of the exposed face of the layer 26 will again be greater than the thickness of the layer 22 and smaller than the width of the narrowest or thinnest information-deonting track 16 which is to be formed in the layer 22; preferably it will be between substantially 2–8 μm.

By resorting to the present invention the advantages desirable and indicated above, are achieved. Naturally, the carrier according to the present invention can be used not only with the apparatus discussed relative to FIG. 1. Such a carrier can be used wherever the information-denoting track is not produced in a purely mechanical manner. It is for instance known to produce the track by electrolytic etching or by heating with a laser beam and in such cases also the carrier according to the present invention can find a useful application.

Regarding the embodiment illustrated in FIG. 2 it is most advantageous to use a foil of synthetic plastic material, e.g. polyethylene or polycarbonate, as substrate layer 21 and to cover it by a vacuum deposited registration layer 22 of aluminum.

On the other hand, it is possible to use a thin sheet of paper as substrate layer 21 for the embodiment illustrated in FIG. 4. The additional layer 26 is composed of a synthetic resin varnish, which can have an arbitrary color.

It will be understood that each of the elements described above, or two or more together, may also find a useful application in other types of constructions differing from the types described above.

While the invention has been illustrated and described as embodied in an information carrier, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An information carrier, comprising at least one substantially flat substrate support layer of dielectric material having a face; and at least one metallic registration layer provided on said face in intimate contact with said face and adapted to have an information-denoting track of a given width formed therein during use, said metallic registration layer having a given thickness and an exposed surface which is uneven and in random fashion provided with hills and valleys the height-differential between which is greater than given thickness and smaller than said given width.

2. An information carrier as defined in claim 1, wherein said height-differential is between substantially 2 μm. and 8 μm.

3. An information carrier as defined in claim 1, wherein said face of said substrate support layer is correspondingly uneven and provided with said hills and valleys having said height differential, and wherein said metallic registration layer is of constant thickness.

4. An information carrier as defined in claim 1, wherein said dielectric material is a synthetic plastic material.

5. An information carrier as defined in claim 1, wherein said substrate support layer is a foil of synthetic plastic material.

6. An information carrier as defined in claim 1, wherein said registration layer is a vapor-deposited metallic layer.

7. An information carrier as defined in claim 6, wherein said predetermined thickness is between substantially 0.01 and 0.5 μm.

8. An information carrier as defined in claim 1; and further comprising an additional layer interposed between said substrate support layer and said registration layer having an exposed face which is formed with hills and valleys corresponding to those of said exposed surface, and having an appearance contrasting with that of said registration layer so as to render more plainly visible a track formed in and penetrating the latter to said additional layer.

9. An information carrier as defined in claim 8, said registration layer being of constant thickness and the height-differential between said hills and valleys of said exposed face being greater than said predetermined thickness of said registration layer and smaller than the minimum width of a track to be formed in the latter.

10. An information carrier, comprising at least one substrate support layer of dielectric material having a face; and at least one metallic registration layer provided on said face and adapted to have an information-denoting track of predetermined width formed therein during use, said metallic registration layer having a predetermined thickness and an exposed surface which is uneven and provided with hills and valleys the height-differential between which is greater than said predetermined thickness and smaller than said predetermined width, and further comprising an additional layer interposed between said substrate support layer and said registration layer and having an appearance contrasting wtih that of said registration layer so as to render more plainly visible a track formed in and penetrating the latter to said additional layer being provided on said face and having an exposed face which is formed with hills and valleys corresponding to those of said exposed surface, said registration layer being of constant thickness and the height-differential between said hills and valleys of said exposed face being greater than said predetermined thickness of said registration layer and smaller than the minimum width of a track to be formed in the latter, the height-differential between said hills and valleys of said exposed face being between substantially 2μm. and 8 μm.

References Cited

UNITED STATES PATENTS

| | | | |
|---|---|---|---|
| 3,019,125 | 1/1962 | Eggenberger | 117—71 X |
| 3,247,927 | 4/1966 | Cragg | 117—227 X |
| 3,281,257 | 10/1966 | Rosen | 117—71 X |
| 2,367,152 | 1/1945 | Strab | 117—71 |
| 2,687,361 | 8/1954 | Traub | 117—107 X |
| 2,833,677 | 5/1958 | Baumlein | 117—71 X |

RALPH J. KENDALL, Primary Examiner

U.S. Cl. X.R.

117—107, 227, 71; 161—213; 346—74